United States Patent
Camaro et al.

(10) Patent No.: US 7,329,399 B2
(45) Date of Patent: Feb. 12, 2008

(54) HYDROGEN TRAPPER COMPOUND, METHOD FOR THE PRODUCTION AND USES THEREOF

(75) Inventors: Sylvie Camaro, Aix en Provence (FR); Quentin Ragetly, Aix en Provence (FR); Chantal Riglet-Martial, Le Tholonet (FR)

(73) Assignees: Commissariat a l'Energie Atomique, Paris (FR); Compagnie Generale des Matieres Nucleaires, Velizy Villacoublay (FR)

( * ) Notice: Subject to any disclaimer, the term of this patent is extended or adjusted under 35 U.S.C. 154(b) by 0 days.

(21) Appl. No.: 10/535,190

(22) PCT Filed: Aug. 25, 2004

(86) PCT No.: PCT/FR2004/050394

§ 371 (c)(1),
(2), (4) Date: May 17, 2005

(87) PCT Pub. No.: WO2005/024884

PCT Pub. Date: Mar. 17, 2005

(65) Prior Publication Data

US 2006/0043333 A1    Mar. 2, 2006

(30) Foreign Application Priority Data

Aug. 29, 2003   (FR) ................... 03 50475

(51) Int. Cl.
- A62D 3/33 (2006.01)
- C01B 3/50 (2006.01)
- C01B 17/00 (2006.01)
- C01B 19/00 (2006.01)

(52) U.S. Cl. ............ 423/508; 423/509; 423/511; 423/560; 423/561.1; 423/648.1; 423/248; 423/658.2; 588/5; 588/15; 588/249; 588/251; 588/901; 106/273.1; 106/284.3; 206/0.7; 252/181.6; 252/184; 252/182.32; 252/182.33

(58) Field of Classification Search .......... 423/508, 423/509, 511, 560, 561.1, 648.1, 248, 658.2; 588/5, 15, 249, 251, 901; 106/273.1, 284.3; 206/0.7; 252/181.6, 184, 182.32, 182.33
See application file for complete search history.

(56) References Cited

U.S. PATENT DOCUMENTS

| | | | |
|---|---|---|---|
| 4,717,510 A | * | 1/1988 | James .................. 588/3 |
| 5,141,610 A | * | 8/1992 | Vaughan .................. 204/520 |
| 5,700,443 A | * | 12/1997 | Yamamoto et al. ........ 423/647.7 |
| 5,888,665 A | | 3/1999 | Bugga et al. |
| 6,616,738 B2 | * | 9/2003 | Iwamoto et al. ............. 96/146 |
| 6,708,546 B2 | * | 3/2004 | Myasnikov et al. .......... 72/121 |
| 6,709,497 B2 | * | 3/2004 | Myasnikov et al. .......... 96/126 |
| 2003/0136989 A1 | | 7/2003 | Amiotti |

FOREIGN PATENT DOCUMENTS

| | | |
|---|---|---|
| IT | 1 318 392 | 8/2003 |
| JP | 10 255660 | 9/1998 |
| JP | 02 980425 | 11/1999 |
| WO | 97/26082 | 7/1997 |
| WO | 01/68516 | 9/2001 |

OTHER PUBLICATIONS

The English abstract of the reference titled "Investigation of the interaction between Co sulfide coatings and Cu(I) ions by cyclic voltammetry and XPS" by Valiuliene et al., Journal of Solid State Electrochemistry vol. 6 No. 6 pp. 396-402 (2002).*

The English abstract of the reference titled "ERDA analysis of ZnSx(OH)y thin films obtained by chemical bath deposition" by Sven Neve et al., Materials Research Society Symposium Proceedings, 668 (II-VI Compound Semiconductor Photovoltaic Materials), H5.3/1—H5.3/6 (2001)., Publisher: Materials Research Society, ISSN 0272-9172.*

The English abstract of the reference titled "A simple absorptiometric for determination of small amounts of sulfide ion" by S. A. Rahim et al., Bulletin of the College of Science, University of Baghdad, 12-13, pp. 130-138 (1973), ISSN 0408-1927.*

Christelle Sing-Teniere: "Etude des procedes de stabilisation/solidification des dechets solides poreux a base de liants hydrauliques ou de liants bitumineux", [Study of stabilization/solidification processes for porous solid waste based on hydraulic binders or bituminous binders], Thesis, Lyons National Institute of Applied Sciences, Feb. 24, 1988.

* cited by examiner

*Primary Examiner*—Timothy C. Vanoy
(74) *Attorney, Agent, or Firm*—Oblon, Spivak, McClelland, Maier & Neustadt, P.C.

(57) ABSTRACT

A hydrogen-trapping compound is provided, along with a process for manufacturing the compound, and its uses, wherein the hydrogen-trapping compound is characterized in that it contains at least one metal salt of formula MX(OH), in which M represents a divalent transition element, for example Co or Ni; O represents an oxygen atom; X represents an atom of group 16 of the Periodic Table of the Elements, excluding O, for example a sulphur atom; and H represents a hydrogen atom, and wherein the hydrogen-trapping compound is effective for trapping hydrogen, hydrogen within a material and free hydrogen and is applicable in situations in which hydrogen is evolved and in which it has to be trapped, especially for safety reasons.

35 Claims, 1 Drawing Sheet

HYDROGEN TRAPPER COMPOUND, METHOD FOR THE PRODUCTION AND USES THEREOF

TECHNICAL FIELD

The present invention relates to a hydrogen-trapping compound, to a process for manufacturing this compound and to the uses of this compound. The term "hydrogen" is understood to mean gaseous dihydrogen of formula G1G2, in which G1 and G2 are $_1^2H$, $_1^2H$ (deuterium) or $_1^3H$ (tritium).

The main property of the hydrogen-trapping compound of the invention lies in the fact that it traps, spontaneously and quantitatively, gaseous hydrogen at atmospheric pressure and even at low partial pressures, and at ambient temperature.

The present invention relates to applications in all situations, for example in industry or in the laboratory, in which gaseous hydrogen or tritium is generated, given off or discharged, with the objective for example of limiting the amount thereof that is discharged, especially for pollution or contamination reasons, or to control the contents thereof in confined environments, especially for safety reasons.

One important application relates to the incorporation of the compound of the invention into a material, for example for the encapsulation of waste, for example a bitumen, within which hydrogen can form, especially by radiolysis. The instantaneous trapping of the hydrogen generated in situ allows the material to retain its integrity, that is to say it does not deform nor crack, which considerably increases its mechanical withstand capability as regards gas production, and therefore its durability.

PRIOR ART

Hydrogen is a potentially dangerous gas that can ignite or explode in the presence of air. Particularly in industrial plants, in the case of a continuous source the hydrogen risk may be prevented either by ventilation, or by controlled combustion, or else by catalytically trapping it in an oxygen-containing environment or by chemically trapping it in an oxygen-depleted environment.

In the case of an oxygen-lean, confined environment, the chemical compounds most widely considered for use as hydrogen-trapping compounds are organic compounds, for example those described in document WO-A-01/68516, metal hydrides, for example those described in document U.S. Pat. No. 5,888,665, or metal oxides. However, depending on the application envisaged, these compounds have a number of drawbacks associated in particular with the potential reversibility of the trapping, with their long-term instability (problems of chemical decomposition, radiolytic decomposition, etc.) and with the operating conditions (temperature, catalyst, etc.).

Moreover, research on the reactivity of hydrogen to solid materials has been intensified in recent years, especially in the field of the development of fuel cells, as regards the way in which compounds allow reversible containment of hydrogen. Within this context, the most promising materials at the present time are solid compounds of the hydride type, for example palladium hydride, titanium-ion nitride, magnesium-nickel hydride, zirconium-manganese hydride, lanthanum-nickel hydride, etc., the adsorptivities of which, expressed as mass of trapped $H_2$ per mass of metal usually have values from 1 to 2%, or carbon tube structures of nanoscale size (called nanotubes) such as those described in document WO-A-97/26082, which can have very high adsorptivities.

Safety and compactness are the significant advantages of these methods of containment. The major drawbacks lie in their cost, their effectiveness, their feasibility and their availability.

It should be noted that the advantages and disadvantages of the various known trapping compounds are intimately associated with their applications. Thus, for example, the essential objective of materials developed for fuel cells is $H_2$ trapping/storage reversibility, but this property is completely unacceptable for applications such as the trapping of $H_2$ generated by radiolysis in the bitumen encapsulation of radioactive waste.

In the nuclear industry, low-level and medium-level radioactive waste is encapsulated in solid matrices, such as bitumen for example. Among the encapsulation materials used, bitumen has many advantages in terms of the containment and encapsulation of the waste. Consisting mostly of aromatic compounds, it counts among the organic matrices that are the least sensitive to irradiation. Thus, its level of radiolytic hydrogen production is quite low, around 0.4 molecules/100 eV. However, owing to its very low transfer properties—a major advantage in fact as regards the intrusion of species and the release of radionuclides in storage or encapsulation scenarios—the bitumen matrix has difficulty in discharging the hydrogen generated in situ by radiolysis, which may result in a loss of integrity of the material (swelling, cracking) if the activity incorporated into the material exceeds the threshold corresponding to the maximum capacity for discharge by diffusion.

The drawbacks associated with the swelling, by internal radiolysis, of the bitumen matrix significantly limit permissible levels that can be incorporated per waste package, hence an increase in the number of packages produced, which is financially disadvantageous.

The incorporation of a hydrogen-trapping compound in bitumen-encapsulated radioactive waste packages would make it possible, on the one hand, to significantly reduce their swellability in storage situations and, on the other hand, to substantially increase equivalent levels incorporated per waste package, while still guaranteeing good mechanical integrity of the material with regard to gas production. However, compounds of the organic type, whether hydrides or nanotubes, are ill-suited in this context, owing to the abovementioned drawbacks of these materials, to which has to be added the potential reversibility of the trapping and the risk of incompatibility, especially chemical incompatibility, within the radioactive-waste packages. The potential reversibility of the trapping is a major drawback of certain known $H_2$-trapping compounds for the radiolytic $H_2$ trapping application in bitumen-encapsulated packages.

SUMMARY OF THE INVENTION

The object of the present invention is specifically to meet the requirement of providing a compound:
- capable of irreversibly and quantitatively trapping hydrogen, both in the state of a free gas and generated within a material, for example by radiolysis, under normal temperature and pressure condition;
- simple to manufacture and easy to handle;
- of low cost;
- stable over time;
- resistant to radiolysis; and
- having a wide range of uses.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The compounds of the present invention are mineral compounds of general formula:

$$MX(OH)$$

in which:
- M represents a divalent transition element;
- O represents an oxygen atom;
- X represents an atom of group 16 of the Periodic Table of the Elements, excluding O; and
- H represents a hydrogen atom.

M may be chosen for example from the group consisting of Cr, Mn, Fe, Co, Ni, Cu and Zn. Preferably, M is Co or Ni.

X may be chosen from the group consisting of S, Se, Te and Po. Preferably, X is S.

The compound of the present invention traps hydrogen, spontaneously and effectively, from ambient temperature upwards, by gas-solid interaction according to an oxidation-reduction mechanism that converts the compound of the invention into MX and the hydrogen into $H_2O$ according to the following chemical equation:

reduction of MX(OH):

$$MX(OH)+e^- \leftrightarrow MX+OH^-$$

oxidation of $H_2$:

$$\tfrac{1}{2}H_2+OH^- \leftrightarrow H_2O+e^-$$

or the overall equation:

$$MX(OH)+\tfrac{1}{2}H_2 \rightarrow MX+H_2O.$$

For example, if M is Co and X is S, CoSOH is converted into CoS and $H_2$ into $H_2O$ according to the following chemical equation:

reduction of CoS(OH):

$$CoS(OH)+e^- \leftrightarrow CoS+OH^-$$

oxidation of $H_2$:

$$\tfrac{1}{2}H_2+OH^- \leftrightarrow H_2O+e^-$$

or the overall equation:

$$CoS(OH)+\tfrac{1}{2}H_2 \rightarrow CoS+H_2O.$$

Furthermore, the compound of the invention may also interact via a similar mechanism with other reducing gases, such as carbon monoxide CO, which is converted into carbon dioxide ($CO_2$ or $H_2CO_3$) or nitric oxide NO, which is converted into nitrogen dioxide ($NO_2$ or $H_2NO_3$).

Figure 1:
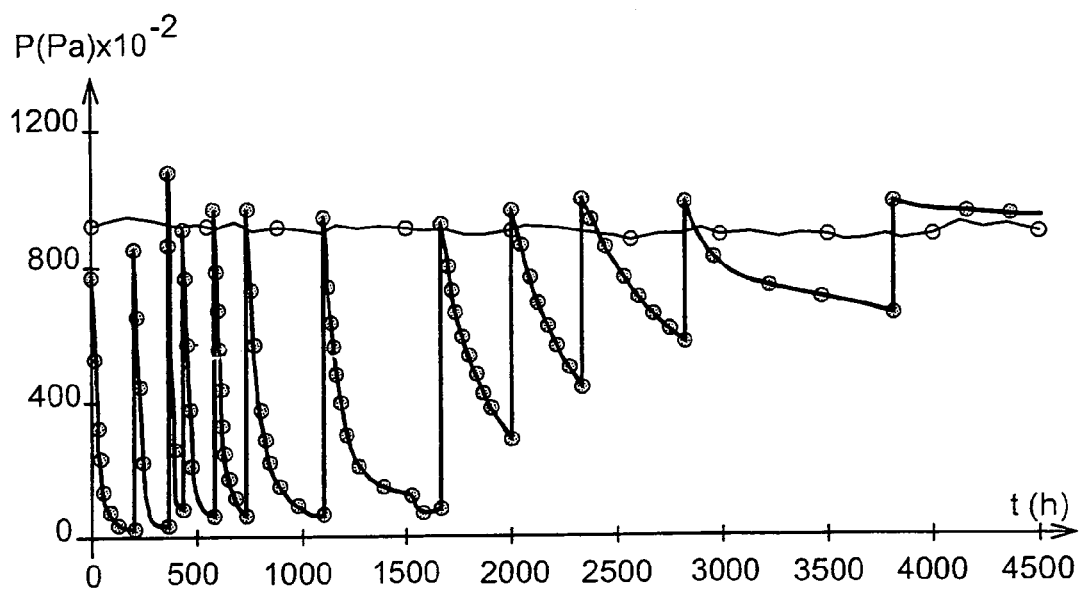
FIG. 1 is a graph illustrating the trapping of hydrogen in a pure hydrogen atmosphere with, on the one hand, a compound of the present invention (curve 1) and, on the other hand, with a commercial compound (curve 2) in an experimental cell.

The compound MSOH of the present invention is an alkali sulphide of the metal M, the chemical composition of which is quite different from that of the commercial MS compound synthesized in acid medium, which has a low reactivity with respect to gaseous hydrogen, as is shown in the appended FIG. 1.

The compounds of the present invention, for example those manufactured with M being Co or Ni, possess a trapping capacity of 0.5 mol of $H_2$ per mol of compound, i.e. 190 litres of $H_2$(STP)/kg of M (STP=Standard Temperature and Pressure, namely 273 K and $10^5$ Pa, respectively), i.e. a trapping capacity, expressed as mass of $H_2$ trapped per mass of M, of 1.7%. The pressure reached at equilibrium is less than $10^3$ Pa (0.01 bar). For example, for compounds having a specific surface area ranging between 25 and 75 $m^2/g$, the trapping rate at a pressure of $10^5$ Pa (1 bar) varies between 0.05 ml (STP) $H_2 \cdot g^{-1} Co \cdot h^{-1}$ and 1.1 ml (STP)$H_2 \cdot g^{-1} Co \cdot h^{-1}$ (i.e. ml of $H_2$ at standard temperature and pressure per gram of Co per hour) within the temperature range from 23.5° C. to 50° C.

The compounds of the invention trap, spontaneously and quantatively, gaseous hydrogen at atmospheric pressure and within a wide $H_2$ partial pressure range between $10^3$ Pa and $10^5$ Pa at ambient temperature. Furthermore, these compounds are also very effective for $H_2$ partial pressures above $10^5$ Pa or below $10^3$ Pa.

The trapping effectiveness of the compounds of the invention therefore place them among the most efficient hydrogen gas trapping compounds. The $H_2$-trapping compound of the present invention operates efficiently from ambient temperature upwards, unlike most other existing compounds, which are not very efficient under normal temperature conditions and whose action is effective only at high temperature. It also operates at temperature, at least up to the temperature of 50° C. that we have tested.

The efficiency of the compound of the present invention was tested within an $H_2$ partial pressure range varying between $10^5$ Pa (1 bar) and $10^3$ Pa (0.01 bar). However, since the trapping reaction is thermodynamically more favourable the higher the $H_2$ partial pressure, it is probable that the trapping compound is also very efficient for $H_2$ partial pressures above $10^5$ Pa (1 bar).

The thermodynamic equilibrium constant of the $H_2$ trapping reaction was not measured, but experience shows that it corresponds to an equilibrium partial pressure of less than $10^3$ Pa, which indicates that the product ought to be more efficient within the partial pressure range varying between equilibrium partial pressure ($<10^3$ Pa) and $10^3$ Pa.

The compounds of the invention, in the pulverulent state, preferably have to be stored away from air, in order to protect them from oxidation.

In general, the compounds of the invention are manufactured from a mixture of divalent metal elements, in order to obtain a mixture of mineral compounds that react with gaseous hydrogen.

The processes for manufacturing the present invention are based on the interaction in aqueous solution of at least one dissolved salt of X (i.e. $X^{2-}$) and at least one dissolved metal salt of M (i.e. $M^{2+}$), so as to form a precipitate of at least one metal salt constituting a compound of the present invention.

The concentrations of the two reactants in aqueous solution may vary over a wide range, up to their solubility limit, for example from $10^{-1}$M to 1.5M.

According to a first embodiment of the invention, the compounds of the invention may be synthesized by mixing two aqueous solutions, a first aqueous solution containing the at least one dissolved salt of the $X^2$ species and a second aqueous solution containing the at least one dissolved metal salt.

According to a second embodiment of the invention, the compounds may be synthesized by simultaneous, or even successive, dissolution of the two reactants, i.e. at least one salt of the $X^{2-}$ species and at least one metal salt, within a single aqueous solution.

Whatever the embodiment according to the invention chosen, the salt of the $X^{2-}$ species may be advantageously chosen from $Na_2X$, $(NH_4)_2X$, $Li_2X$, $K_2X$ or a mixture thereof.

Whatever the embodiment according to the invention chosen, the metal salt of M may be advantageously chosen from: $MSO_4.xH_2O$; $M(NO_3)_2$; $M(ClO_4)_2.xH_2O$ or $MCl_2$, M being defined as above.

The hydrogen-trapping compounds of the present invention are stable in aqueous solution over a wide pH range. However, if the pH of the final suspension is adjusted to too low or too high a value, the compounds of the invention are liable to decompose, which may considerably reduce the quantity of product that reacts with hydrogen. Consequently, it is preferable to ensure that the pH of the final suspension lies within the 4 to 12 range, preferably within the 7.5 to 10.5 range.

The precipitation yield of the compounds of the present invention is optimum for a theoretical $[X^{2-}]/[M^{2+}]$ molar ratio between 7/8 and 1. If the $[X^{2-}]/[M^{2+}]$ molar ratio is less than the optimum ratio, the synthesis results in compounds of the same composition as those of the present invention, but precipitation yield is less. Thus, depending on the quality of the reactants (alkali metal sulphide and metal salt), an optimum precipitation yield may advantageously be achieved by fixing an $[X^{2-}]/[M^{2+}]$ molar ratio between 7/8 and 1.5.

The compounds of the present invention, after being synthesized in the form of precipitates in suspension, may be separated out from their aqueous phase by, for example, decanting, filtering or centrifuging. Optionally, they may then be washed with water and then dried in air or in an inert atmosphere, for example at a temperature of 70° C. to 140° C. The risk of the product oxidizing in air is reduced if the drying temperature is low (~70° C.), which may require quite a long drying time. Thus, the drying temperature adopted experimentally is preferably a compromise between speed of drying and minimization of the risk of oxidation of the product. As an order of magnitude, the drying time is 36 hours at 70° C. for a wet compound extracted by centrifuging, resulting in 10 g of dry compound.

The dry compounds obtained may be ground and optionally screened so as to obtain a uniform particle size. This treatment may be useful, especially when the compounds of the present invention are incorporated into a material, in particular for the sake of integrity of the matrix and uniform hydrogen-trapping within the said material.

As regards the $H_2$ trapping, from a theoretical standpoint the more divided the product the higher its specific surface area and the more efficient the product therefore is (the trapping yield approaches the thermodynamic yield). Experimentally, the reactivity of the compound to $H_2$ is such that the particle size of the compound does not constitute a critical parameter. In other words, the product remains efficient whatever its particle size.

In contrast, the particle size of the salts is important in terms of their incorporation into a solid material, so as to preserve the integrity of the matrix (risk of cracking) and to guarantee good uniformity of the encapsulant. In the case of a bitumen matrix, the typical particle size of the incorporated salts varies between 0.2 and 300 μm, with a maximum in the 20 to 50 μm range.

The compounds of the present invention may be incorporated, or encapsulated, in an organic material, either in dry or wet pulverulent form, preferably with a uniform particle size, for example one of those particle sizes mentioned above, or in the form of a precipitate in suspension, preferably in a non-oxidizing solution.

This incorporation falls within a number of applications of the present invention in which the $H_2$ trapping is carried out actually within a material, for example an organic material, in which the $H_2$ is generated and/or into which it can migrate by internal or external diffusion. The material then forms a matrix into which the $H_2$-trapping compound is incorporated. For example, it may be a waste-encapsulation material, such as a bituminous material for nuclear waste or an inert material intended to stabilize the initially pulverulent trapping material in a compact form exhibiting good mechanical integrity and therefore able to be handled more easily.

An organic material able to incorporate the $H_2$-trapping compound of the present invention may for example be the bitumen used for encapsulation of radioactive waste.

The bitumens that can be used in the present invention may be those known to those skilled in the art.

The compounds of the present invention are preferably incorporated into an organic material that is chemically inert to the said compounds and in a suitable proportion so as not to degrade the mechanical properties of the said material once it has cured.

According to the invention, in the example of a bitumen-based material, the amount of hydrogen-trapping compound (s) that can be incorporated may advantageously be from 1.5% to 82% in total, expressed as mass of compound/mass of bitumen.

Whatever the matrix in question, the maximum amount of salts that can be incorporated, including the $H_2$-trapping compound, is the result of a compromise between the level of incorporation, handlability and integrity of the final encapsulant. In the case of a bituminous matrix, the maximum salt content, whatever the salt incorporated, cannot according to these criteria exceed 45 wt % (expressed as mass of salt)/encapsulant, i.e. 82 wt %/bitumen. This means that if the trapping compound is introduced in a quantity of x % relative to the mass of bitumen, then at most the waste is introduced in a quantity of (82–x)% relative to the mass of bitumen.

Moreover, our trials have shown, for the CoSOH compound, that below a Co content of 0.45 wt %/encapsulant for a bitumen encapsulant containing 45% of salt filler, i.e. a CoSOH content of 1.5 wt %/bitumen, the trapping of the $H_2$ generated by radiolysis at a mean dose rate of 400 Gy/h is insignificant.

Consequently, the amount of trapping compound(s) that can be incorporated into a bitumen matrix could advantageously vary between 1.5 wt %/bitumen and 82 wt %/bitumen. Our own trials were carried out with trapping compound contents varying between 1.5% and 20%, expressed as mass of trapping compound/mass of bitumen.

The incorporation into the organic material may be carried out by any process known to those skilled in the art for incorporating a powder or a suspension into a material, especially by mixing, for example mechanical mixing, of the compound of the present invention with the material, optionally made in liquid form beforehand, for example by dissolving or heating it, followed by the curing of the encapsulant material, optionally after evaporation of the solvent and/or cooling.

When the compound of the invention is in the form of a preparation in suspension, the liquid phase may be partially removed by decanting, before incorporation of the compound of the invention into the organic material. The liquid phase may also be evaporated by heating during incorporation of the compound into the organic material.

The present invention also relates to an organic encapsulation material, the said material comprising an organic encapsulation material and a hydrogen-trapping compound according to the invention.

The waste, which may be encapsulated by means of such an encapsulating material, may be a radioactive solid waste, for example obtained by the chemical coprecipitation treatment of a radioactive effluent, or else a non-radioactive industrial solid waste such as, for example, a spent catalyst that cannot be recycled, or an active-carbon waste, for example as described in the document by Christelle Sing-Tenière entitled "Etude des procédés de stabilisation/solidification des déchets solides poreux à base de liants hydrauliques ou de liants bitumineux" [*Study of stabilization/solidification processes for porous solid waste based on hydraulic binders or bituminous binders*], Thesis, Lyons National Institute of Applied Sciences (24 Feb. 1988).

The organic encapsulation material may be a bitumen, for example such as those known to those skilled in the art for encapsulating radioactive waste. It may also be any other organic material suitable for encapsulating radioactive waste, or any other organic material suitable for encapsulating non-radioactive waste, depending on the application of the present invention.

In one example of an application, the compound of the present invention may be used for example for trapping radiolytic hydrogen within an organic matrix for the encapsulation of radioactive waste.

Thus, the present invention also relates to a method of encapsulating a solid waste, the said method comprising the following steps:
  a) encapsulation using an organic encapsulation material, liquefied beforehand by heating the solid waste to be encapsulated, and of a hydrogen-trapping compound according to the present invention; and
  b) cooling and solidification of the encapsulant obtained in step a).

The encapsulation matrices that can be used, and also the solid waste that can be encapsulated using this method, will be described above.

When the solid waste is radioactive, it may be obtained by any method known to those skilled in the art for extracting a solid radioactive waste from an effluent.

For example, when the effluent is a liquid, it may be advantageous to carry out a chemical coprecipitation treatment on the effluent. Thus, according to an advantageous variant of the method of the invention, the chemical coprecipitation treatment may have the dual objective of decontaminating the radioactive effluent, by a chemical coprecipitation treatment resulting in solid radioactive waste, and of synthesizing in situ the $H_2$-trapping compound according to the synthesis method described in the present document. In this variant, the solid coprecipitation phase obtained, consisting of a mixture of the radioactive solid waste and the $H_2$-trapping compound, is incorporated directly into the organic encapsulation material according to step a) of the method of the invention.

According to the invention, in the example of encapsulation in a bituminous matrix, the maximum salt content (i.e. the waste+trapping compound sum) in the encapsulant cannot exceed 45%/encapsulant (expressed as mass of salt/mass of encapsulant), i.e. 82%/bitumen (expressed as mass of salt/mass of bitumen).

In general, the solid waste to be encapsulated and the hydrogen-trapping compound according to the present invention are preferably mixed before their encapsulation, so as to obtain a uniform distribution of the compound of the invention and of the waste within the encapsulant and thus to enhance the hydrogen-trapping efficiency.

There are very many applications of the present invention, since it can be used in all situations, for example in industry or in the laboratory, in which gaseous hydrogen (or tritium) is generated, given off or discharged, with the objective for example of limiting the amount thereof that is discharged into the environment, especially for pollution or contamination reasons, or to control the levels thereof in confined environments, especially for safety reasons.

The use of a hydrogen or tritium trap using the compound of the present invention may be accomplished by various means, which will be chosen depending on the conditions of use and on the environment in which the trap is used. As examples, mention may be made of the following means:
  by bringing hydrogen gas into direct contact with the pulverulent compound screened from the air;
  by making hydrogen, introduced by bubbling or else generated in situ, come into direct contact with a suspension formed by the compound of the present invention in a non-oxidizing solution;
  by holding the pulverulent compound between two porous plates through which hydrogen or the gas containing the hydrogen to be trapped can diffuse;
  by incorporating the compound of the present invention into a material that is chemically inert with respect to the product. This may be an organic or non-organic solid material or one in the viscous state, through which the hydrogen diffuses or within which the hydrogen is generated, for example by radiolysis;
  by surface deposition of the hydrogen-trapping compound, as a layer of suitable thickness and screened from the air, on all or some of the external faces of the chemical system that generates hydrogen gas;
  by incorporation of one or more successive layers of the compound of the present invention as a sandwich within the chemical system that generates hydrogen gas.

In the example of the encapsulation of low-level and medium-level radioactive waste in a bitumen matrix, the hydrogen-trapping compound of the present invention, incorporated into the bitumen matrix, has several major advantages:
  it possesses the dual chemical property of being a radionuclide decontaminant and a hydrogen trap;
  used as a decontamination reactant in the case of the prior treatment process carried out on the radioactive effluents, the compound of the present invention is naturally present in the processing sludge encapsulated in the bitumen, in which sludge the compound is chemically stable;
  the routine use of the compound of the present invention within the context of an effluent treatment process avoids having to use other hydrogen-trapping reactants, the chemical stability of which within the reprocessing sludge remains to be demonstrated and the use of which would not be economically profitable since it would entail increasing the amount of sludge and therefore the number of packages;

being chemically inert with respect to the bitumen matrix, the compound of the present invention retains its hydrogen-trap capabilities after the operations of hot encapsulation of the sludge into the bitumen;

being insensitive to irradiation and protected from oxidation within the bitumen matrix, the compound of the present invention durably retains its reactivity with respect to hydrogen; and the compound of the present invention is reactive both with respect to hydrogen gas under normal temperature and pressure conditions, and to hydrogen generated, especially by radiolysis, within the bitumen matrix.

Thus, the incorporation of the compound of the present invention into an organic material, for example the bitumen used as radioactive-waste encapsulation matrix, makes it possible to reduce the apparent production of hydrogen by radiolysis, and correspondingly the capability of the material to swell. This application is economically important in industrial reprocessing plants, as the chemical properties of the compound of the present invention allow the possibility of substantially increasing the equivalent activity levels incorporated per waste package, while still guaranteeing good mechanical integrity of the material with respect to gas production.

Other features and advantages of the present invention will become even more clearly apparent on reading the examples that follow, these being given of course by way of illustration but implying no limitation, with reference to the appended figures.

DESCRIPTION OF THE FIGURES

FIG. 1 is a graph illustrating the trapping of hydrogen in a pure hydrogen atmosphere with, on the one hand, a compound of the present invention (curve 1) and, on the other hand, with a commercial compound (curve 2) in an experimental cell. In this graph, the variation in hydrogen pressure P (expressed in $10^2$ Pa (mbar)) is plotted as a function of time in hours (t(h)).

Figure 2:
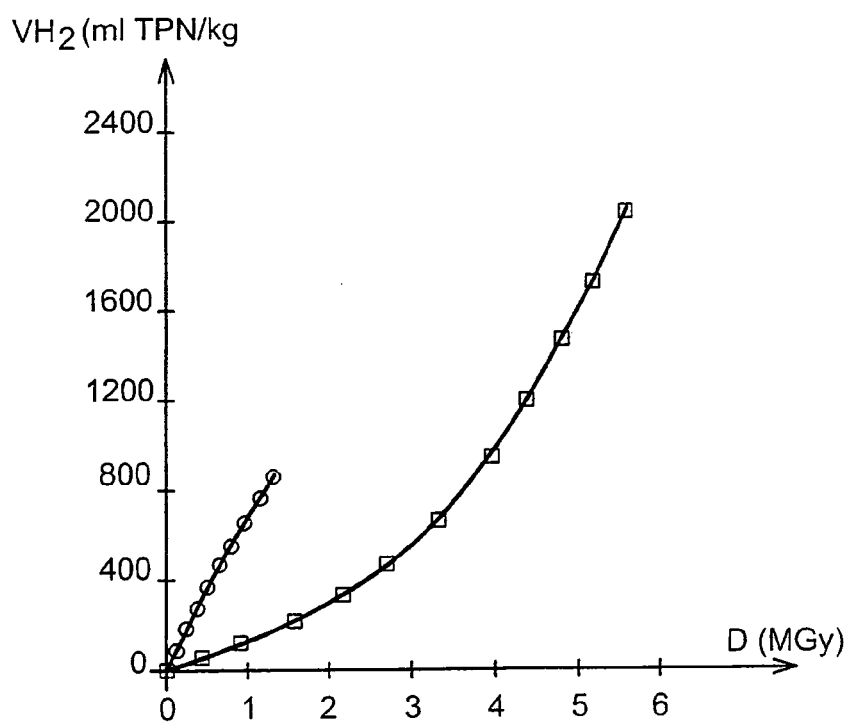
FIG. 2 is a graph illustrating the volume of hydrogen (V $H_2$ (in ml)) given off per kg of bitumen, on the one hand in a pure bitumen (-○- curve) and, on the other hand, in a bitumen encapsulant according to the present invention.

FIG. 2 is a graph illustrating the volume of hydrogen (V $H_2$ (in ml)) given off per kg of bitumen, on the one hand in a pure bitumen (-○- curve) and, on the other hand, in a bitumen encapsulant according to the present invention, i.e. one that includes a compound of the present invention (-□- curve) as a function of the integrated dose (expressed in MGy).

EXAMPLES

Example 1

Hydrogen-Trapping Experiment, Using Direct Contact with the Pulverulent Compound In this example, a compound of the COS(OH) form was synthesized in the laboratory by mixing, with magnetic stirring, two aqueous solutions, namely a cobalt sulphate (97 wt % purity) solution and a sodium sulphide (35 wt % purity) solution in S/Co proportions of 1.5.

The pH of the solutions, initially 5.1 and 13.3 respectively, was not adjusted. The pH of the final suspension was not adjusted either.

In this experiment, part of the precipitate obtained, which was black in colour, was dried at 100° C. after filtration and washing with water. It was then ground so as to obtain a powder with a particle size ranging from 0.7 to 15 μm.

Ten grams of the compound in the dry CoS(OH) form, in the pulverulent state, were placed in a 100 ml sealed cell at ambient temperature (22±3° C.) in a pure hydrogen atmosphere.

Consumption of hydrogen by the compound was monitored experimentally by measuring the drop in the hydrogen pressure in the cell, the atmosphere being regularly replenished in order to compensate for the hydrogen depletion as a function of time. This replenishment allowed the change in the reaction rate over the course of time and the durability of the effect to be evaluated.

The consumption of hydrogen by the compound of the invention was manifested by a pronounced and experimentally measurable decrease in the hydrogen pressure inside the cell, as may be seen in the appended FIG. 1. This figure shows the variations in the total pressure P (expressed in $10^2$ Pa (mbar)) within the cell as a function of time (expressed in hours (h)). Each discontinuity in the trapping curve (curve 1) corresponds to a replenishment of the atmosphere in the cell.

For comparison, FIG. 1 also shows the experimental curve of $H_2$ consumption (curve 2) obtained from a commercial product of CoS form. No significant hydrogen trapping was observed with the commercial product.

From the experimental data, it was possible to determine the trapping capacity of the compound as about 0.5 mol $H_2$/mol of cobalt, a value equivalent to its thermodynamic trapping capacity. This result indicates that the trapping reaction is total and not limited, for example rate-limited.

This experiment demonstrates the capability of the compound of the present invention to spontaneously and quantatively trap hydrogen gas at ambient temperature by direct contact, according to a gas/solid-type reaction.

This experiment makes it possible to confirm the applications of the compounds of the present invention, for example within the context of hydrogen risk control.

Example 2

Hydrogen-Trapping Experiment, the Hydrogen being Generated In Situ by Radiolysis, Using a Compound of the Present Invention Encapsulated in a Bitumen Part of the compound in suspension, the synthesis of which was described in Example 1 above, and to which an inert barium sulphate mineral filler was added, was intimately mixed with molten bitumen at 140° C. until complete evaporation of the water and the formation of a homogeneous mixture containing 10% salts (wt %/encapsulant), including 0.8% cobalt (wt %/encapsulant).

The bitumen encapsulant obtained comprised the compound of the invention in COS(OH) form with a content of 1.5% Co/encapsulant (wt %).

The sole function of the barium sulphate salt was to increase the mineral filler content in the encapsulant so as to obtain better dispersion and uniformity of the compound of the present invention within the encapsulant.

The material was a bitumen typically used in the encapsulation of low-level and medium-level radioactive waste. It consisted of a mixture of organic products of high molecular weight belonging mainly to the following three groups: aliphatic, naphthenic and aromatic groups. An average elemental composition was the following: 85% C; 10% H, 1.5% O; 1.0% N and 2.5% S (wt %).

A specimen of the encapsulant containing the compound of the present invention and a specimen of pure bitumen were subjected to external irradiation with a mean dose rate of 400 Gy/h, until a total integrated dose of 5.6 MGy was achieved. The dose rate from the source, which decreased per time, varied between 450 Gy/h and 360 Gy/h over the course of the experiment, which lasted 580 hours. Since the total integrated dose was 5.6 MGy, the mean dose rate over the course of the experiment was therefore 400 Gy/h.

Experimental hydrogen evolution data (FIG. 2) demonstrate that, for a production rate of about 660 ml of $H_2$ per kg of bitumen per MGy, i.e. about 0.30 ml of $H_2$ per kg of bitumen per hour under the conditions of the trial, the efficiency of the trapping, by the COS(OH) compound, the hydrogen generated by radiolysis of the bitumen was around 80% up to a total integrated dose of 1.5 MGy.

After a total integrated dose of around 4.5 MGy, the $H_2$ evolution curve for the encapsulant (-□- curve) asymptotically joins the evolution curve (-○- curve) for the pure bitumen specimen, which indicates that the compound incorporated into the encapsulant has reached its maximum trapping capacity.

From the experimental data, the trapping capacity within the encapsulant was determined as 0.48 mol of $H_2$ per mol of Co, i.e. 182 l (STP) of $H_2$ per kg of Co, i.e. a value equivalent to the capacity measured independently on the pulverulent compound and close to the theoretical maximum trapping capacity (0.5 mol of $H_2$ per mol of Co, i.e. 190 l (STP) per kg of Co) of the compound.

These observations demonstrate that the compound of the present invention in the form of COS(OH) is chemically inert with respect to the bitumen and retains all its hydrogen-trapping capabilities, even after the hot-encapsulation operations.

Furthermore, the compound of the present invention is insensitive to irradiation, and is reactive both to hydrogen gas under normal temperature and pressure conditions and to hydrogen generated by radiolysis of the bitumen matrix.

The inventors have demonstrated in this example that the incorporation of a compound of the present invention, for example in the form of CoS(OH), into an organic matrix, for example under the conditions described above, allows the hydrogen formed in the said matrix to be trapped.

For example within the field of nuclear-waste encapsulation, the invention makes it possible to reduce the apparent production of hydrogen by radiolysis of the bitumen encapsulants exposed to irradiation, and, correspondingly, to significantly reduce the ability of the bitumen-encapsulated radioactive-waste packages to swell in a storage situation.

The invention claimed is:

1. A process for manufacturing a hydrogen-trapping compound, comprising at least one mineral compound of general formula:

MX(OH)

wherein:
M represents a divalent transition element;
O represents an oxygen atom;
X represents an atom of group 16 of the Periodic Table of the Elements, excluding O; and
H represents a hydrogen atom, comprising:
mixing, in aqueous solution, at least one dissolved salt of M dissolved $X^{2-}$ and at least one dissolved metal salt of M forming a precipitate of the at least one mineral compound of the formula MX(OH); wherein the precipitate is suspended in the aqueous phase.

2. The process of claim 1, wherein the $X^{2-}$ salt is $Na_2X$, $(NH_4)_2X$, $Li_2X$, $K_2X$ or a mixture thereof.

3. The process of claim 1, wherein the metal salt of M is selected from the group consisting of: $MSO_4.xH_2O$; $M(NO_3)_2$; $M(ClO_4)_2.xH_2O$; and $MCl_2$; wherein M represents a divalent transition element; and wherein x is a number greater than or equal to zero.

4. The process of claim 3, wherein M is Co or Ni.

5. The process of claim 3, wherein X is S.

6. The process of claim 1, wherein the mixing in aqueous solution is carried out a pH of 4 to 12.

7. The process of claim 1, wherein the molar ratio of the concentrations $[X^{2-}]/[M^{2+}]$ is from 0.875:1 to 1.5:1.

8. The process of claim 1, wherein the at least one precipitated metal salt is extracted from the suspension in the aqueous phase; wherein extraction comprises: filtering, washing with water, and drying.

9. The process of claim 1, wherein M is selected from the group consisting of Cr, Mn, Fe, Co, Ni, Cu and Zn.

10. The process of claim 1, wherein X is selected from the group consisting of S, Se, Te and Po.

11. A method of encapsulating a solid waste comprising:
a) encapsulating the solid waste and a hydrogen-trapping compound, comprising at least one mineral compound of general formula:

MX(OH)

wherein:
M represents a divalent transition element;
O represents an oxygen atom;
X represents an atom of group 16 of the Periodic Table of the Elements, excluding O; and
H represents a hydrogen atom, with an organic encapsulation material to form an encapsulant; wherein prior to encapsulation the solid waste, the hydrogen-trapping compound, and the organic encapsulation material are heated; and wherein prior to encapsulation the organic encapsulation material is liquefied;
b) cooling the encapsulant; and
c) solidifying the encapsulant.

12. The method of claim 11, wherein the organic encapsulation material is a bitumen.

13. The method of claim 12, wherein the hydrogen-trapping compound is mixed with the bitumen in an amount of 1.5 to 82% in total, expressed as mass of trapping compound with respect to the mass of bitumen.

14. The method of claim 11, wherein the solid waste is non-radioactive.

15. The method of claim 11, wherein the solid waste is radioactive.

16. The method of claim 15, wherein the radioactive waste represents at least 45 wt % of the total mass of the solid waste encapsulated with the composite organic material.

17. The method of claim 15, further comprising chemically coprecipitating the radioactive waste in solid form and the hydrogen-trapping compound in order to obtain a solid phase comprising a mixture of the radioactive solid waste and of the hydrogen-trapping compound prior to being encapsulated.

18. The method of claim 11, wherein M is selected from the group consisting of Cr, Mn, Fe, Co, Ni, Cu and Zn.

19. The method of claim 11, wherein X is selected from the group consisting of S, Se, Te and Po.

20. The method of claim 11, wherein M is Co or Ni.

21. The method of claim 11, wherein X is S.

22. An organic material for encapsulating radioactive waste, comprising an organic encapsulation material and at least one hydrogen-trapping compound, comprising at least one mineral compound of general formula:

MX(OH)

wherein:
M represents a divalent transition element;
O represents an oxygen atom;
X represents an atom of group 16 of the Periodic Table of the Elements, excluding O; and
H represents a hydrogen atom.

23. The organic material for encapsulating radioactive waste of claim 22, wherein the organic encapsulation material is a bitumen.

24. The organic material for encapsulating radioactive waste of claim 22, wherein the at least one hydrogen-trapping compound represents in total an amount of 1.5 to 82% expressed as mass of trapping compound with respect to the mass of bitumen.

25. The organic material of claim 22, wherein M is selected from the group consisting of Cr, Mn, Fe, Co, Ni, Cu and Zn.

26. The organic material of claim 22, wherein X is selected from the group consisting of S, Se, Te and Po.

27. The organic material of claim 22, wherein M is Co or Ni.

28. The organic material of claim 22, wherein X is S.

29. A method for trapping hydrogen comprising contacting the hydrogen with at least one mineral compound of general formula:

MX(OH)

wherein:
M represents a divalent transition element;
O represents an oxygen atom;
X represents an atom of group 16 of the Periodic Table of the Elements, excluding O; and
H represents a hydrogen atom.

30. The method of claim 29, wherein the hydrogen is produced by radiolysis of a radioactive waste and wherein the trapping is conducted within an organic material which encapsulates the both the hydrogen-trapping compound and the radioactive waste.

31. The method of claim 30, wherein the organic material is bitumen.

32. The method of claim 29, wherein M is selected from the group consisting of Cr, Mn, Fe, Co, Ni, Cu and Zn.

33. The method of claim 29, wherein X is selected from the group consisting of S, Se, Te and Po.

34. The method of claim 29, wherein M is Co or Ni.

35. The method of claim 29, wherein X is S.

* * * * *